United States Patent
Lu et al.

(10) Patent No.: US 8,002,871 B2
(45) Date of Patent: Aug. 23, 2011

(54) METHODS AND APPARATUS FOR AN OXYGEN FURNACE QUALITY CONTROL SYSTEM

(75) Inventors: Yongzai Lu, Cappell, TX (US); Lucy He, Shangai (CN)

(73) Assignee: Honeywell International Inc., Morristown, NJ (US)

( * ) Notice: Subject to any disclaimer, the term of this patent is extended or adjusted under 35 U.S.C. 154(b) by 746 days.

(21) Appl. No.: 12/024,275

(22) Filed: Feb. 1, 2008

(65) Prior Publication Data
US 2009/0193936 A1    Aug. 6, 2009

(51) Int. Cl.
*C21C 5/00* (2006.01)
(52) U.S. Cl. ............. 75/375; 700/209; 700/286; 700/28
(58) Field of Classification Search .................. 700/209, 700/286, 28; 75/375
See application file for complete search history.

(56) References Cited

U.S. PATENT DOCUMENTS
2007/0142975 A1 *  6/2007  Piche ............................. 700/286
* cited by examiner

*Primary Examiner* — Kakali Chaki
*Assistant Examiner* — Tejal J Gami
(74) *Attorney, Agent, or Firm* — Ingrassia Fisher & Lorenz

(57) ABSTRACT

A method for control of a basic oxygen furnace includes creating a computer-implemented model of the basic oxygen furnace based on support vector regression (SVR) such that the model is configured to produce a prediction of first turndown quality of the basic oxygen furnace. Historical data associated the first turndown quality is received. The model is applied to the historical data to produce a prediction of first turndown quality, which is compared to an actual measurement of first turndown quality. The control recipe for the basic oxygen furnace based at least in part upon a result of the comparison. The system generally includes a preprocessor, a database configured to store historical data associated with first turndown quality of the basic oxygen furnace, a prediction module coupled to the database, and a run-to-run control module. A graphical user interface is provided for visualization and adjustment of data.

17 Claims, 7 Drawing Sheets

METHODS AND APPARATUS FOR AN OXYGEN FURNACE QUALITY CONTROL SYSTEM

FIELD OF THE INVENTION

The present invention generally relates to process control schemes and, more particularly, to methods and apparatus for on-line quality prediction and control of the first turndown quality associated with an oxygen furnace.

BACKGROUND OF THE INVENTION

A basic oxygen furnace (BOF) is a batch chemical reactor that converts hot metal produced from a blast furnace to liquid steel with the desired steel grade, composition, weight, and temperature. To do so, high-purity oxygen is blown through a molten bath to lower the carbon, silicon, manganese, and phosphorous contents of the liquid iron. The impurities and a small amount of oxidized iron are then carried off in the molten slag that floats on the surface of the hot metal. After the steel has been refined, the molten steel is poured into a preheated ladle. Alloys are added to the ladle during this pouring operation in order to give the steel the precise composition desired—referred to as the "first turndown".

The precise control of BOF first turndown quality and batch production times is an important factor in maximizing steel productivity and yield, reducing energy and material consumption, and balancing the prediction path from the BOF to the continuous casting operation. Decrease in both the mean and standard deviation of the error between target and actual quality is also economically desirable.

Presently known BOF systems are difficult to control. For example, there is typically almost no real-time information available during the BOF batch process, and thus the quality at the end of the batch depends entirely on the recipe at the starting point of the batch. Furthermore, the BOF process is very complex and highly nonlinear, and the performance of a static charge model can be unsatisfactory. Because of the lack of real-time quality information during the batch process, the prediction and control of first turndown quality at the charge is important in effectively controlling BOF production.

The function of a BOF predictor is to generate the prediction of the quality (i.e., major chemical compositions, temperature, and weight) at the first turndown with minimum prediction error between the actual and predicted quality. Most prior art prediction methods are based on a feedforward neural network (NN) with back propagation (BP) supervised learning. However, the EMR (empirical minimum risk) type neural network training can result in over-fitting of the data if the termination of NN training cannot be controlled properly. On the other hand, the generalization performance heavily relies on the training examples selected from the huge amount of historical batch data—namely, the inputs, the predicted quality, and the actual results at the first turndown batch after batch.

This control system can also be illustrated with the concept of data pattern mapping from the uncontrollable input space and aim quality (at the first turndown) space representing the target quality space to the output space, i.e., the charge decision space. From a computation point of view, such a complex system cannot provide a unique solution with consistency, particularly for noisy data. To improve the open loop control quality, it has been a secondary measure to predict the first turndown quality with uncontrollable inputs and calculated charge decisions in terms of machine learning and data mining techniques.

Accordingly, a need therefore exists for an on-line (networked) system that provides more precise prediction results and control decisions under variable production conditions and with noisy data at the time of charge operations. More particularly, such system should be capable of providing control decisions irrespective of batch data quality and controllability of input space. Other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
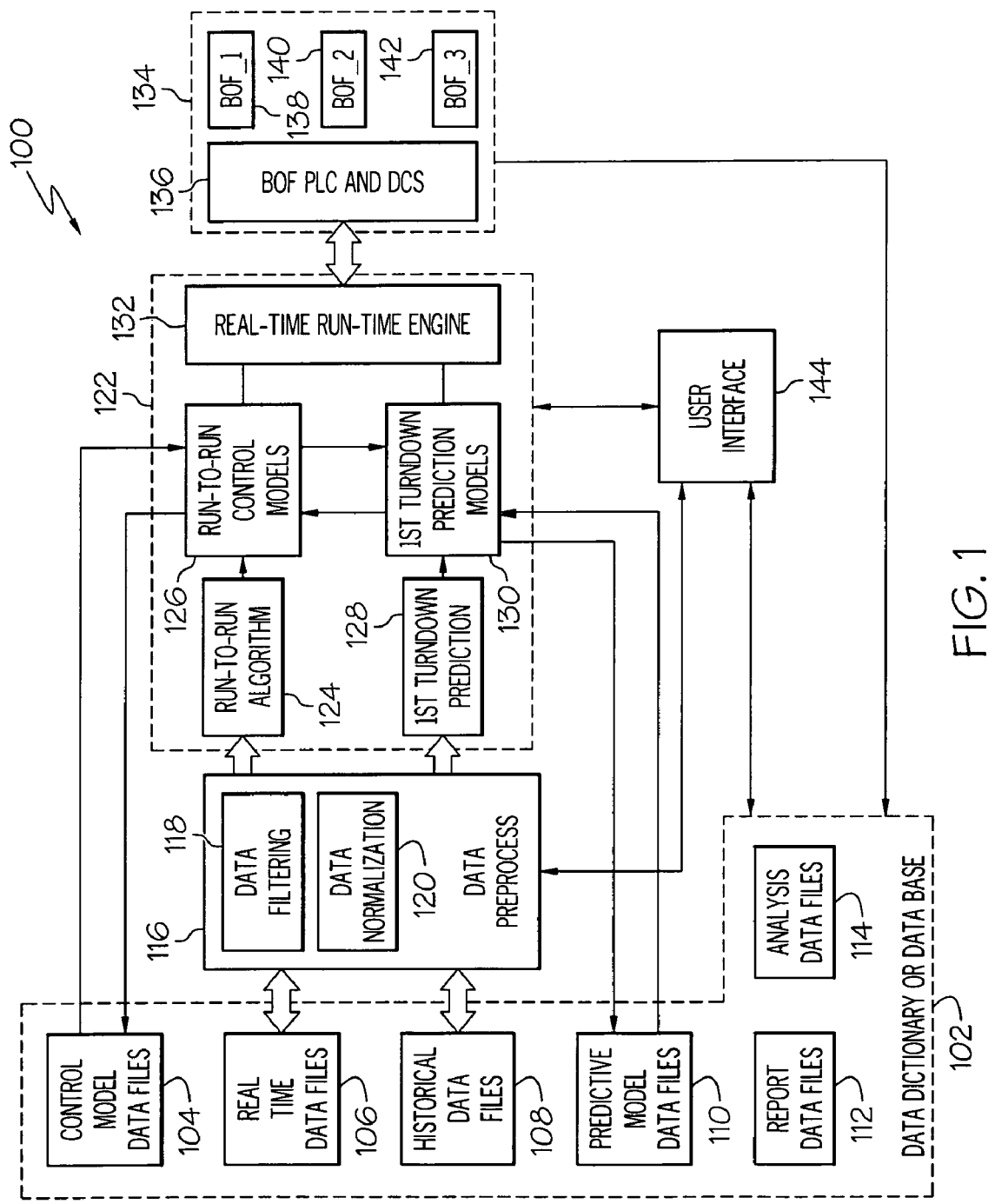
FIG. 1 depicts a conceptual block diagram of a BOF process control system in accordance with one embodiment.

The present invention generally relates to online (i.e., networked) systems and methods for control of a basic oxygen furnace utilizing a computer-implemented model of the furnace based on support vector regression (SVR) such that the model is configured to produce a prediction of first turndown quality. The model is applied to historical data to produce a prediction of first turndown quality, which is compared to an actual measurement. The control recipe for the basic oxygen furnace based at least in part upon a result of the comparison, and the model is updated. The system generally includes a preprocessor, a database configured to store historical data associated with first turndown quality of the basic oxygen furnace, a prediction module coupled to the database, and a run-to-run control module. A graphical user interface is provided for visualization and adjustment of data.

The following detailed description is merely exemplary in nature and is not intended to limit the range of possible embodiments and applications. Furthermore, there is no intention to be bound by any theory presented in the preceding background or the following detailed description.

For simplicity and clarity of illustration, the drawing figures depict the general structure and/or manner of construction of the various embodiments. Descriptions and details of well-known features and techniques may be omitted to avoid unnecessarily obscuring other features. Elements in the drawings figures are not necessarily drawn to scale: the dimensions of some features may be exaggerated relative to other elements to assist improve understanding of the example embodiments.

Terms of enumeration such as "first," "second," "third," and the like may be used for distinguishing between similar elements and not necessarily for describing a particular spatial or chronological order. These terms, so used, are interchangeable under appropriate circumstances. The terms "comprising," "including," "having" and any variations thereof as used in the claims or specification are open terms used synonymously to denote non-exclusive inclusion. The term "exemplary" is used in the sense of "example," rather than "ideal."

The embodiments of the invention described herein are, for example, capable of use in sequences other than those illustrated or otherwise described herein. Unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The connecting lines shown in the various figures contained herein are intended to represent example functional relationships and/or physical couplings between the various elements. It should be noted that many alternative or additional functional relationships or physical connections may be present in a practical embodiment.

In the interest of conciseness, conventional techniques, structures, and principles known by those skilled in the art may not be described herein, including, for example, conventional steelmaking processes, basic oxygen furnace operation, and standard computer modeling and process control principles.

Figure 7:
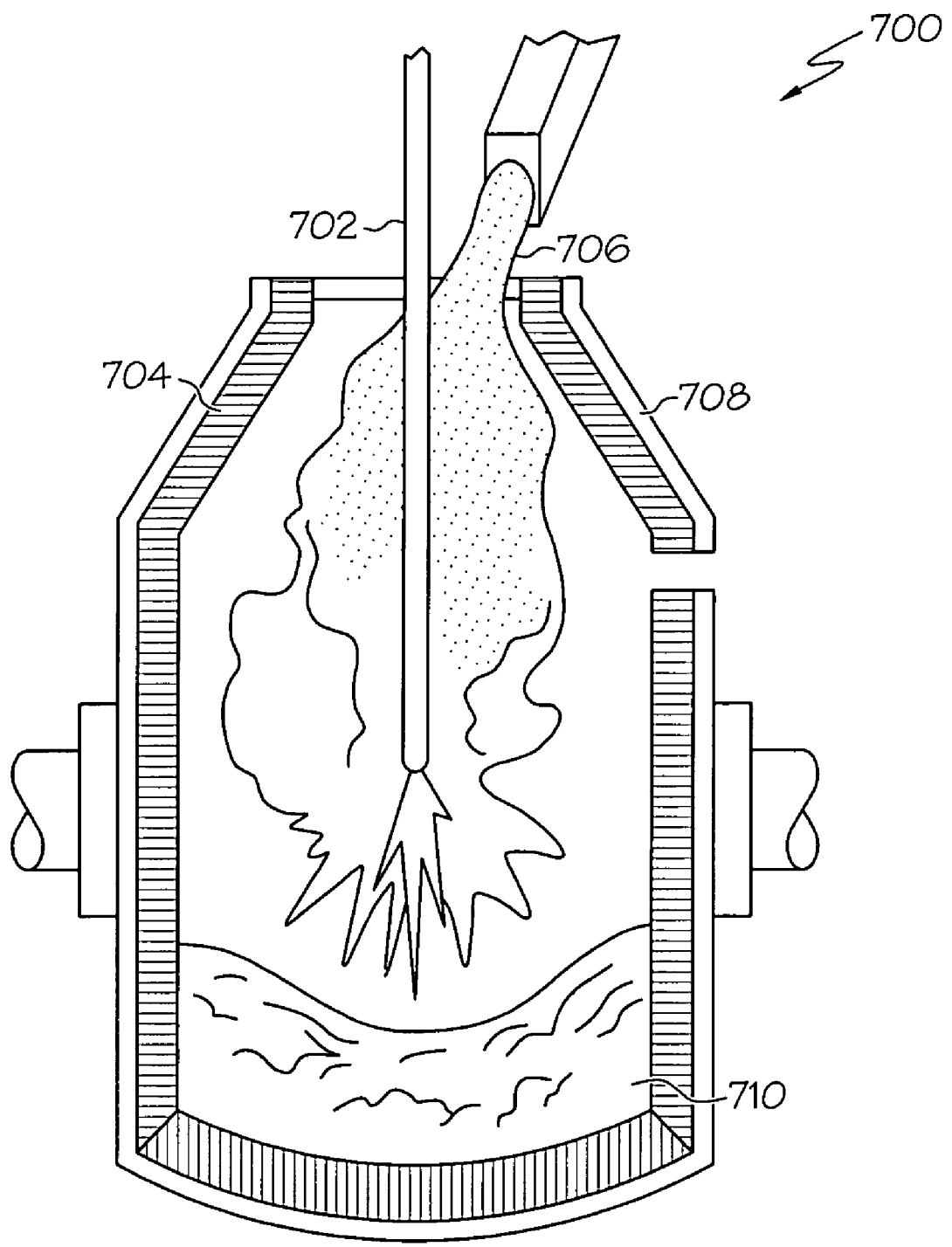
FIG. 7 depicts a typical BOF process useful in illustrating the present invention.

In general, the present invention relates to methods and systems for quality control of, for example, first turndown quality in a basic oxygen furnace (BOF) system. Referring briefly to FIG. 7, a basic oxygen furnace (BOF) 700 is a batch chemical reactor that converts the hot metal produced from a blast furnace to the liquid steel with desired steel grade. Within a steel shell 708 having a refractory lining 704, high purity oxygen is blown via an oxygen lance 702 through the molten bath 710 to lower the carbon, silicon, manganese, and phosphorous contents of the liquid iron. The impurities and a small amount of oxidized iron are carried off in the molten slag that floats on the surface of the hot metal 710. After the steel has been refined, the furnace 700 is tilted (opposite to the charging side, where flux charge 706 is introduced) and molten steel 710 is poured out into a preheated ladle (not shown). Alloys are added to the ladle during the pour to give the steel the precise composition desired.

The present invention provides methods and systems for on-line quality prediction and control of a BOF. More particularly, referring now to FIG. 1, a system in accordance with one embodiment includes a database module (or simply "database") 102, a data preprocessor 116, a prediction module (128, 130), a run-to-run control module (124, 126), a graphic user interface 144, and external interface module 134.

Prediction control module 122 provides on-line predictions of the first turndown quality of the BOF. The predicted result is integrated with the existing charge model to improve the BOF quality at the first turndown. Prediction module 122 includes a run-to-run algorithm 124, and a run-to-run control model block (or simply "R2R control model") 126 for adjusting the control recipe for the next batch production. Prediction control module further includes a $1^{st}$ turndown prediction module 128 coupled to a $1^{st}$ turndown prediction model block 130, which communicates with run-to-run control model block 126. Both blocks 130 and 126 are coupled to real-time run-time engine 132.

An external interface module 134 provides suitable hardware and/or software interfaces for downloading and uploading data from PLC, DCS and other upper-level machines (module 136), as well as the various BOFs (138, 140, and 142).

Database 102 is configured to store control model data 104, real-time data 106, historical data 108, predictive model data 110, report data files 112, and analysis data files 114, each of which is described in further detail below.

Data preprocessor 116 receives data from blocks 106 and 108 and provides data examination, data processing and analysis, and includes a data filtering module 118 and a data normalization module 120.

Graphic user interface module 144 provides a graphical view for real-time application results and allows a human operator to adjust and view the results. In one embodiment, module 144 includes a graphical interface (e.g., a Windows-based application) wherein the user can select which BOF to predict and control; download the historical data 108 (and/or other data within database 102); select which model (within block 130) to use for prediction; edit and set up model parameters (104); save data sets; and provide data visualization. User interface 144 communicates with prediction & control module 122 via suitable control messages as is known in the art. The prediction and control algorithms may, for example, be implemented as Windows ".dll" files.

With continued reference to FIG. 1, the principle modules of the proposed system architecture will be described in further detail. First, database module 102 comprises files created and maintained to record names of the various data files as well as build/edit/retrieve data attributes for real-time, historical and model data. This database may be implemented, for example, as an SQL database.

Historical Data Files 108 are preferably automatically created in view of production and quality data. The data attributes and the relevant format can be defined or designed by the developer or application engineer. In a preferred embodiment, the original historical data files cannot be edited by the user, but the user may run data filters to remove outliers or dummy data during data preprocess, described in further detail below. The length of the historical data, e.g., the number of calendar days or the number of batches, may be defined manually. The user may also define and format the attributes of the historical data files.

Real-time data files 106 include data related to hot metal chemicals, temperature, etc., and are transferred from the production PLC Controllers or any remote sensors (not shown). Real-time data 106 is provided to $1^{st}$ turndown prediction model 130 and R2R control model 126 for real-time decisions and controls. The user may define and format the attributes of the real-time data files.

Predictive model data files 110 store relevant parameters for prediction models 130, such as SVM tuning parameters and the like. Data files 110 are updated when these parameters are updated after retraining. Similarly, control model data files 104 store the relevant parameters for control models 126, such as the learning and tuning parameters.

Data preprocessing module 116 allows the various data files to be examined, repaired, and transformed. This module preferably allows production of new data sets as well as data filtering, data normalization, data pattern clustering, data pattern classification, automatic data growth and evolution.

Figure 3:
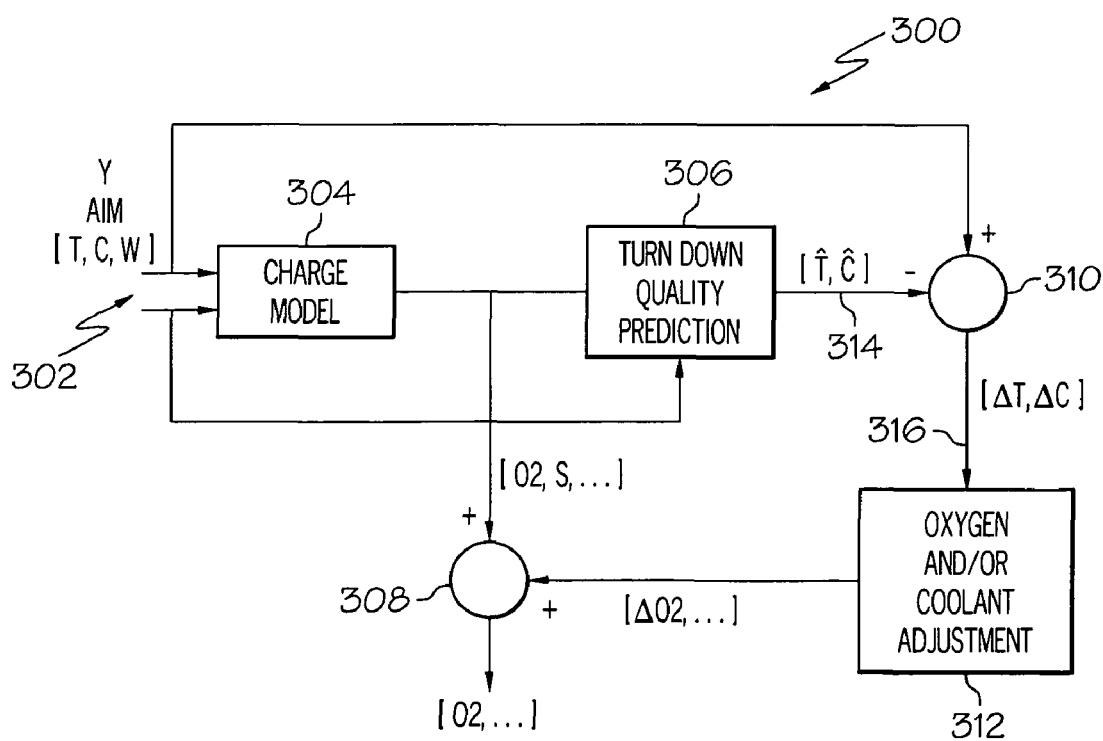
FIG. 3 depicts a flowchart of an exemplary process for adjusting the oxygen and coolant with first turndown quality prediction in accordance with one embodiment.

In operation, first turndown prediction model 130 (or simply "prediction model") is generally implemented to predict the quality of the resulting material such as carbon percentage and temperature at the first turndown accomplished at the end of batch time in terms of the observations of controllable and uncontrollable variables. In one embodiment, a support vector model (SVM) with multivariate statistics is implemented in accordance with aspects of the present invention in the development of the first turndown prediction model. The major functionalities of this module include: building the first turndown prediction model; specifying, training, and testing datasets; training and updating the various models; model cross validation; off-line experiments with the prediction model; running the model in an online dataset; generating and saving the model datasets for on-line use; interfacing with historical and real-time datasets as well as the real-time run-time engines;

FIG. 3. depicts a flowchart depicting the adjustment of oxygen and coolant in connection with first turndown quality prediction. In general, the BOF converts molten iron and a certain amount of steel scraps and flexes into desired liquid steel under an oxidized chemical reaction. The BOF first turn down quality vector, Y, includes steel temperature (T), weight (W), and Carbon and other chemicals (C). The controllable input vector, Uc, includes oxygen volume, scrap weight, blast furnace hot metal weight, iron ore and variety of fluxes. The hot metal chemical compositions and temperature are the uncontrollable vectors, Ud. To minimize the error between aim quality and actual quality at first turndown, a BOF charge model 304 is used to calculate the values of the charge variables. Oxygen and/or coolant adjustment is provided by module 312, and prediction is provided by block 306.

The data pattern map for charge calculations (model) can be described as follows:

$$[Ud, Yaim]^T \rightarrow Uc \quad (1)$$

The data pattern map for BOF quality prediction at the first turndown can be described as follows:

$$[Ud, Uc]^T \rightarrow Y \quad (2)$$

Predictor 306 is a secondary model used to improve the performance of charge model 304. The task of BOF quality prediction is to develop a prediction model that minimizes the errors between the actual and predicted quality under a desired time window or a moving window, and can be represented as follows:

$$\underset{predictor}{\text{Min}} \sum \|Y_{actual}(k) - Y_{pred}(k)\| k = 1, K \quad (3)$$

Based on the calculated charge decisions and the uncontrollable BF hot metal information, the predictor provides the estimated first turndown quality that may be used to further generate the adjustment of the charge decisions manually, or in terms of a simple rule set and/or calculations. Based on the actual charge created after adjustment, the charge operation is initiated and real time information is acquired. The BOF predictor is then run again to predict the estimated quality with real-time information, and the estimated results may be used to modify the calculated oxygen blow volume.

Figure 2:
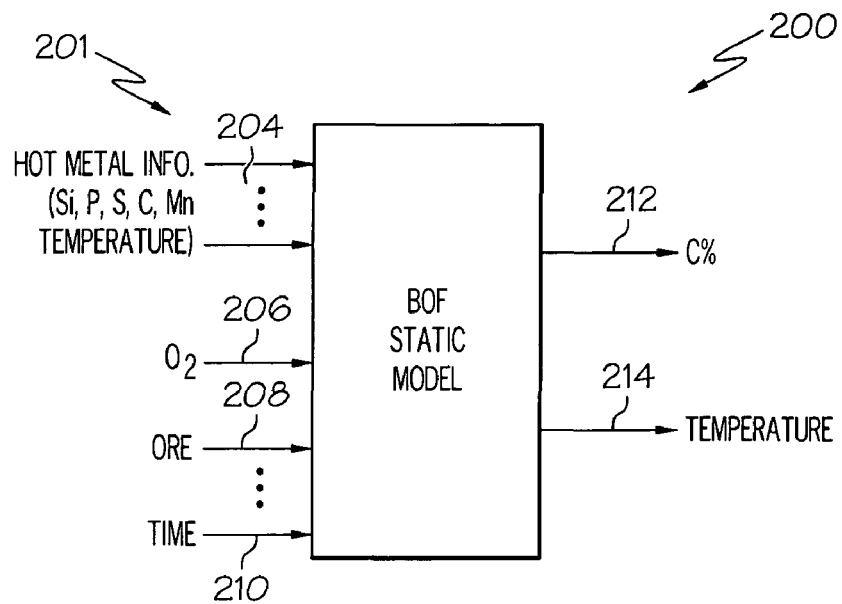
FIG. 2 depicts a static BOF model for predicting carbon percent and temperature in a steelmaking process in accordance with one embodiment.

The output of the charge model is typically used predict the turndown quality. This predicted quality can be compared with the aim quality or target quality to generate quality level deviation (typically in terms of temperature and carbon composition). The oxygen or coolant adjustment is implemented as a function of the quality level deviation and the charge model output FIG. 2 shows and exemplary framework for a BOF static model 200. The inputs 201 includes hot metal Si %, hot metal Mn %, hot metal P %, hot metal S %, hot metal temperature, and hot metal weight (collectively, 204), oxygen level 206, ore, lump, stone, burnt, and scrape levels (collectively, 208), and time 210. The outputs include carbon % (212) and Temperature (214).

Given a pool of raw sampling data, a set of variable data $\{(x_i, y_i), x_i \in X^{14}, y_i \in Y^2 \ i=1, \ldots, n+m\}$ is selected according to the Min-Max ranges. Then normalization is applied to this set of data. Random selection of n patterns from the normalized data set determines the training data set $\{((x_i, y_i), i=1, \ldots, n)\}$, where m patterns determine the test data set $\{((x_i, y_i), i=1, \ldots, m)\}$ As mentioned above, the BOF may be modeled via SVR. The output of the BOF is two-dimensional, and an SVR deals with only one output one time. Thus, it is desirable to build two isolated models for the BOF from two data sets: $\{(x_i, y^1{}_i), x_i \in X^{14}, y^1{}_i \in Y \ i=1, \ldots, n+m\}$ and $\{(x_i, y^2{}_i), x_i \in X^{14}, y^2{}_i \in Y \ i=1, \ldots, n+m\}$. The building process for these two models is the same. In order to keep accordance with the techniques stated above, the following model is built from data set $\{(x_i, y_i), x_i \in X^{14}, y_i \in Y \ i=1, \ldots, n+m\}$, and the final BOF model with SVR is presented as:

$$f(x) = \sum_{i=1}^{n} \overline{\alpha}_i K(x_i, x) + b \quad (4)$$

The main task is to produce values of $\overline{\alpha}_i$, $i=1, \ldots, n$ and b. First, the system initializes all $\overline{\alpha}_i$, b to zero and sets kernel parameters $\sigma$, soft margin $\epsilon$, and penalty parameter C with default values. Then, the system trains all patterns $\{((x_i, y_i), i=1, \ldots, n)\}$ with SMO to find $\overline{\alpha}_i$, $i=1, \ldots, n$ and b.

An exemplary training process proceeds as follows: If the system is on the first iteration, or if the previous iteration made no progress, then let the working set be all the training data points $\{(x_i, y_i) | i=1, \ldots, n)\}$. Otherwise, let the working set consists only of data points with non-bounded Lagrange multipliers $\{(x_i, y_i) | 0 < \overline{\alpha}_i < C, i=1, \ldots, n)\}$.

Next, for all data points in the working set, the system loops through the following procedure: two multipliers are picked to be optimized according to applicable heuristics (stated above), and update these two multipliers with the update rules (also as stated above). If no progress was made, and the working set was all data points, then stop. Otherwise, return to the first step. Note that support vectors defined in accordance with aspects of the present invention render the training process insensitive to the quality of the historical data because learning occurs at higher dimensional space formed by the kernels.

When the training process is done, i.e. when the BOF model has been built, a model function is determined. The system tests the performance of this BOF model by calculating error between the target value and the prediction output of each test pattern. Conventional mean value and standard deviation of the error may be used to measure the performance.

The system divides the refining data into two data sets: the "training data" and the "test data". In $\epsilon$-SV regression, the goal is to find a flat function $f(x)$ that has at most e deviation from the actually obtained targets Yi for all the training data. A type of loss function termed the $\epsilon$-insensitive loss function may be used. For the case of noisy data, the system introduces slack variables $\xi_i$, $\xi^*_i$ for each training data, where $\xi_i = -(y - f(x_i, w)) - \epsilon$ and $\xi^*_i = y - f(x_i, w) - \epsilon$. In the case of nonlinear function, $f(x)$ takes the form $f(x,w) = w \cdot \phi(x) + b$, where $\phi$ is a mapping from x space to feature space $\phi(x)$, w is a weighting vector, and b is a constant denoting the bias. Here, and RBF kernel function is used:

$$K(x,y) = \exp(-\|x-y\|^2 / 2\sigma^2) \quad (5)$$

Sequential minimum optimization (SMO) is used as the SVM training algorithm to solve the quadratic problem. At every search step, SMO choose only two Lagrange multipliers to jointly optimize, finds the optimal values for these multipliers, and updates the SVM to reflect the new optimal values. It consists of two parts: (1) a set of heuristics for efficiently choosing pairs of Lagrange multipliers to work on, and (2) the analytical solution to a QP problem of size two. Therefore, in accordance with above aspects of the invention, optimal separators can be found in feature spaces with many dimensions that reduces computational load substantially without compromising prediction errors.

Data preprocessing and data normalization are preferably used. It is undesirable to use the raw data cannot as inputs and supervised outputs for the BOF predictor because they are not properly scaled and often include missing data due to the dummy measurements. The BOF raw data may also be checked with logical rules developed by principle analysis and plant operations. For example, the BF hot metal chemicals and temperatures should be within certain minimums and maximums.

In accordance with one embodiment, the "mean-variance" normalization approach is used. The normalization and denormalization algorithms can be represented as follows:

$$x_n = \frac{x - x_m}{x_{var}} \quad (6)$$

$$x = x_n x_{var} + x_m$$

Where the mean value and variance can be calculated from the system data as follows:

$$x_m = \sum_{k=1}^{K} \frac{x_k}{K} \quad (7)$$

$$x_{var} = \sqrt{\frac{1}{K-1} \sum_{k=1}^{K} (x_k - x_m)(x_k - x_m)}$$

Where K represents the number of the sample data. Similarly, the sample output y is also normalized for the training of the model. When the predictor is at working phase, the output of the predictor need to be demoralized before the predicted value is used for the adjustment of calculated charge decision.

Data Clustering is preferably performed by the system. Since the empirical SVR statistical learning model is established through learning from example, the selection of the training samples becomes important in producing a trained model with adequate robustness and generalization. To ensure that the learning samples are uniformly distributed on the input space, and to adapt the changes of the working environment with evolutionary growth, the learning and test examples are preferably updated daily based on the BOF database. The training samples should extend the entire operating environment with extended operation for multiple days, and to reduce computation time, the system continuously limits training data patterns through pattern clustering. The density of the patterns can be adjusted by setting the minimum distance between any two patterns on the input hyperspace.

The system preferably uses a pattern classification oriented algorithm for the selection of the training pattern in the input hyperspace. Patterns with significant similarity should not be included at the same time. The pattern similarity can be quantitatively measured by the Euclidean distance between the patterns in a hyperspace. The Euclidean distance between any two valued patterns $X^i$ and $X^j$ may be defined as:

$$d_{ij} = \|X^i - X^j\| \quad (8)$$

If the distance between the new sample data and any of the data from the training data set is less than the least distance $\epsilon_d$, it should not be introduced to the training data.

Figure 4:
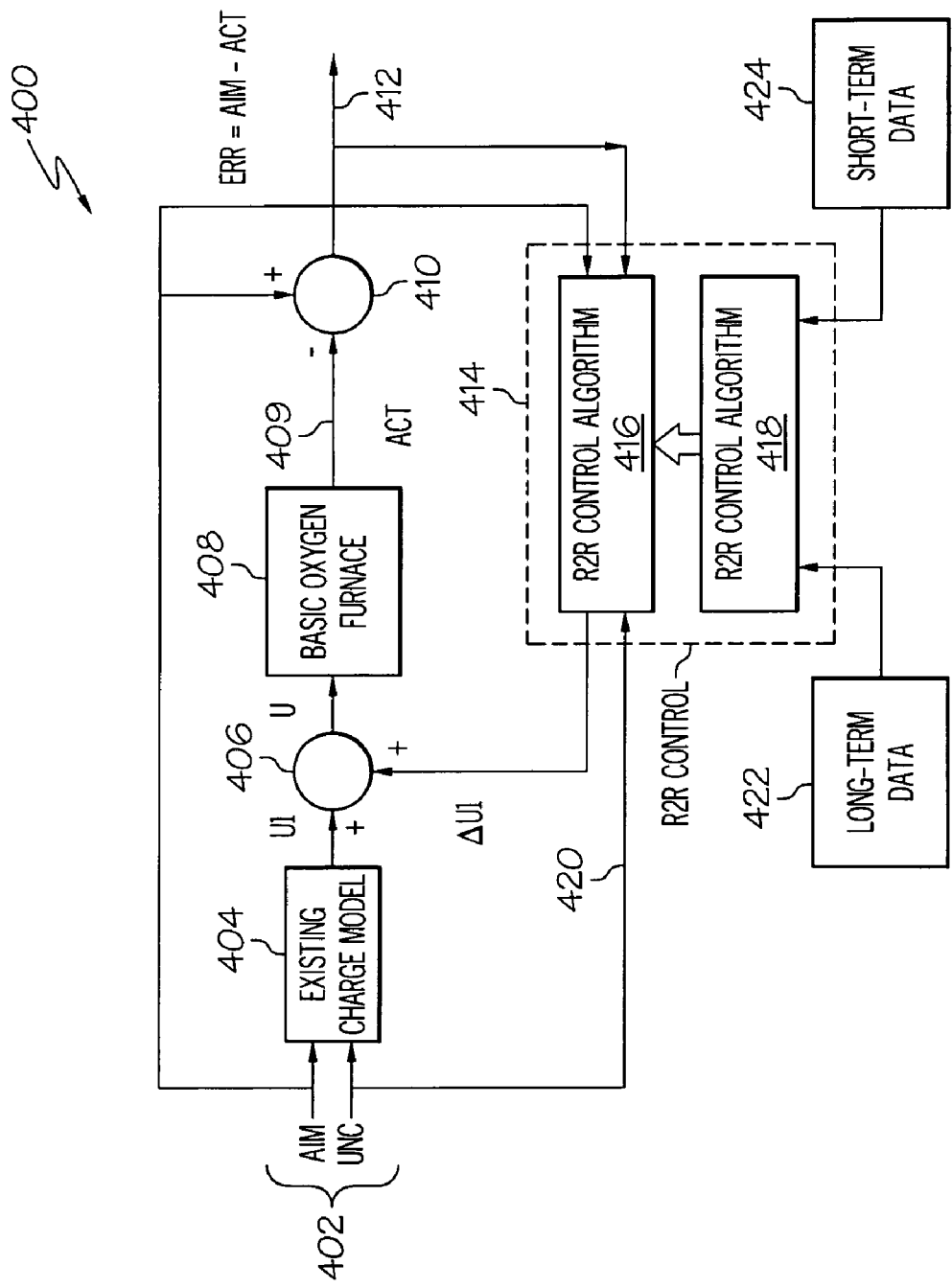
FIG. 4 depicts a run-to-run control model for BOF charge decisions in accordance with one embodiment.

The BOF learning control system combines a charge model 404 with a long-term and short-term R2R control as shown in FIG. 4. The function of R2R control 414 is to provide real-time adjustment for the control recipe in terms of the long-term and short-term data (422 and 424) built from the results of the historical batch runs.

As shown in FIG. 4, the inputs 402 of R2R controller 400 for BOF 408 include the uncontrollable vector D (UNC) and the AIM quality at first turndown. The outputs of R2R control are the adjustment of the control recipe $\Delta U1$ generated through the associative memories built up through learning from the previous batch runs. Thus, goal of BOF R2R control 414 is to compromise the recipe adjustment results given by long-term and short-term associative memories based on BOF historical and fresh data.

The model with long-term associative memories can be built with tradition regression SVM, etc. The general algorithms of BOF hybrid control include the steps of data processing, building a control model with data pattern mapping, and application of the control model.

Data Processing includes receiving historical batch process data, dividing the data file into a number of sub-datasets corresponding to BOF number, removing outlier batches with data filtering from the data sets, performing data normalization with a selected algorithm, and performing clustering and classification using, for example, a grid method;

Building the control model preferably includes utilizing a data pattern mapping ({Aim X–Act X, D}→{U–U1}), using SVM to build a control model with long-term associative memories, building a grid-based model in terms of each sub dataset (e.g., a unique model structure with grid-oriented model parameters).

Application of the control model proceeds as follows: when starting a new heat, the system collects the relevant Aim X and D. The existing charge model is then run to determine U1; The long-term memory model is then run to determine the recipe adjustment from long-term associative memory. Next, the system runs the short-term memory model to determine the recipe adjustment from short-term associative memory and determines the recipe adjustment $\Delta U1$ from $\Delta U_1^L$ and $\Delta U_1^S$.

Figure 5:
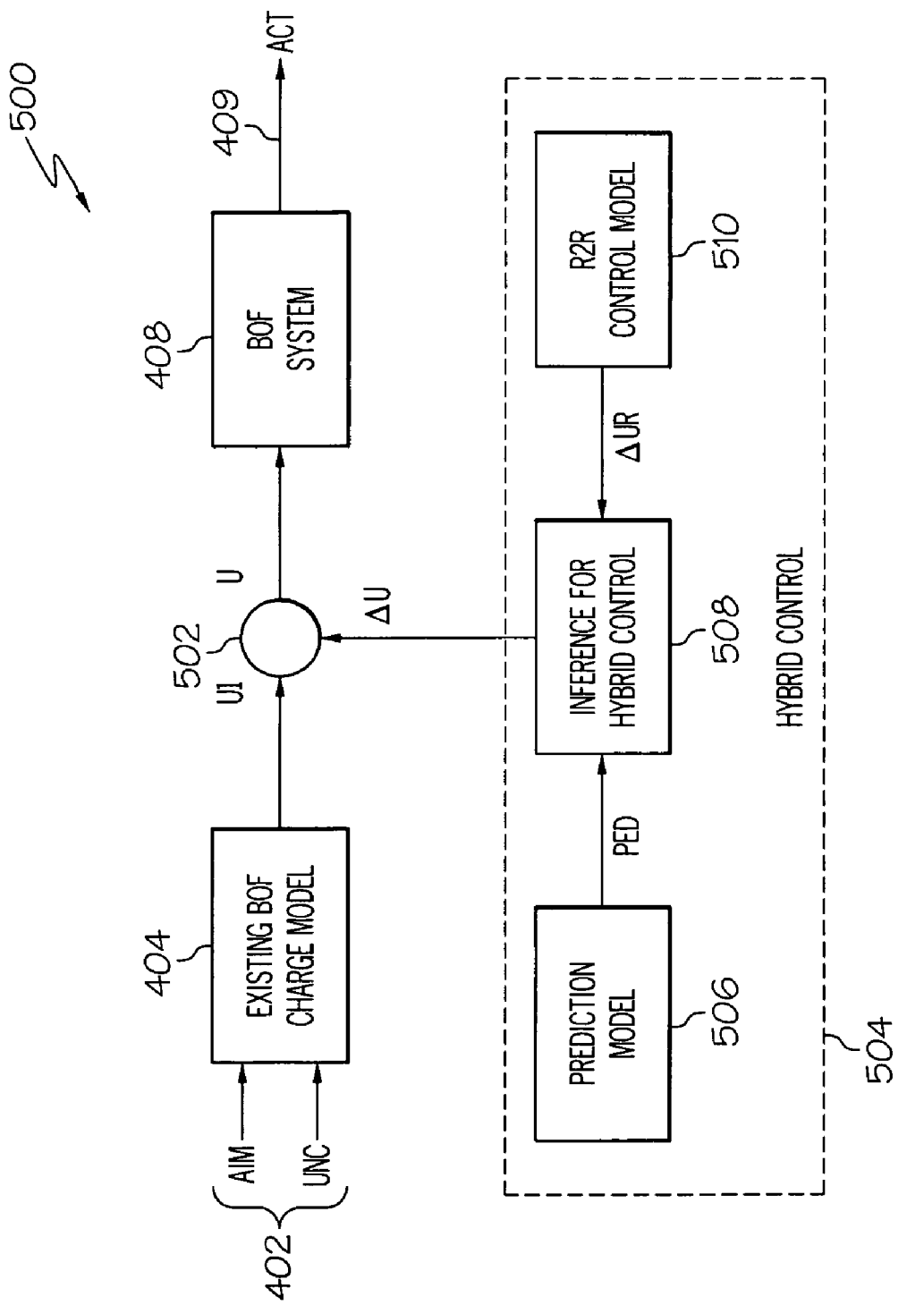
FIG. 5 depicts a hybrid control model for BOF charge decisions in accordance with one embodiment.

FIG. 5 depicts the hybrid control model for BOF charge decisions that may be used in connection with the present invention. Specifically, it shows an alternate embodiment where a hybrid control module 504 is used in place of the system shown in FIG. 4. Hybrid control module 504 includes a prediction model 506 (that produces prediction results) as well as an R2R control model 510 (that produces recipe adjustments), both of which are fed into an inference block 508, which determines the desired value of $\Delta U$.

Figure 6:
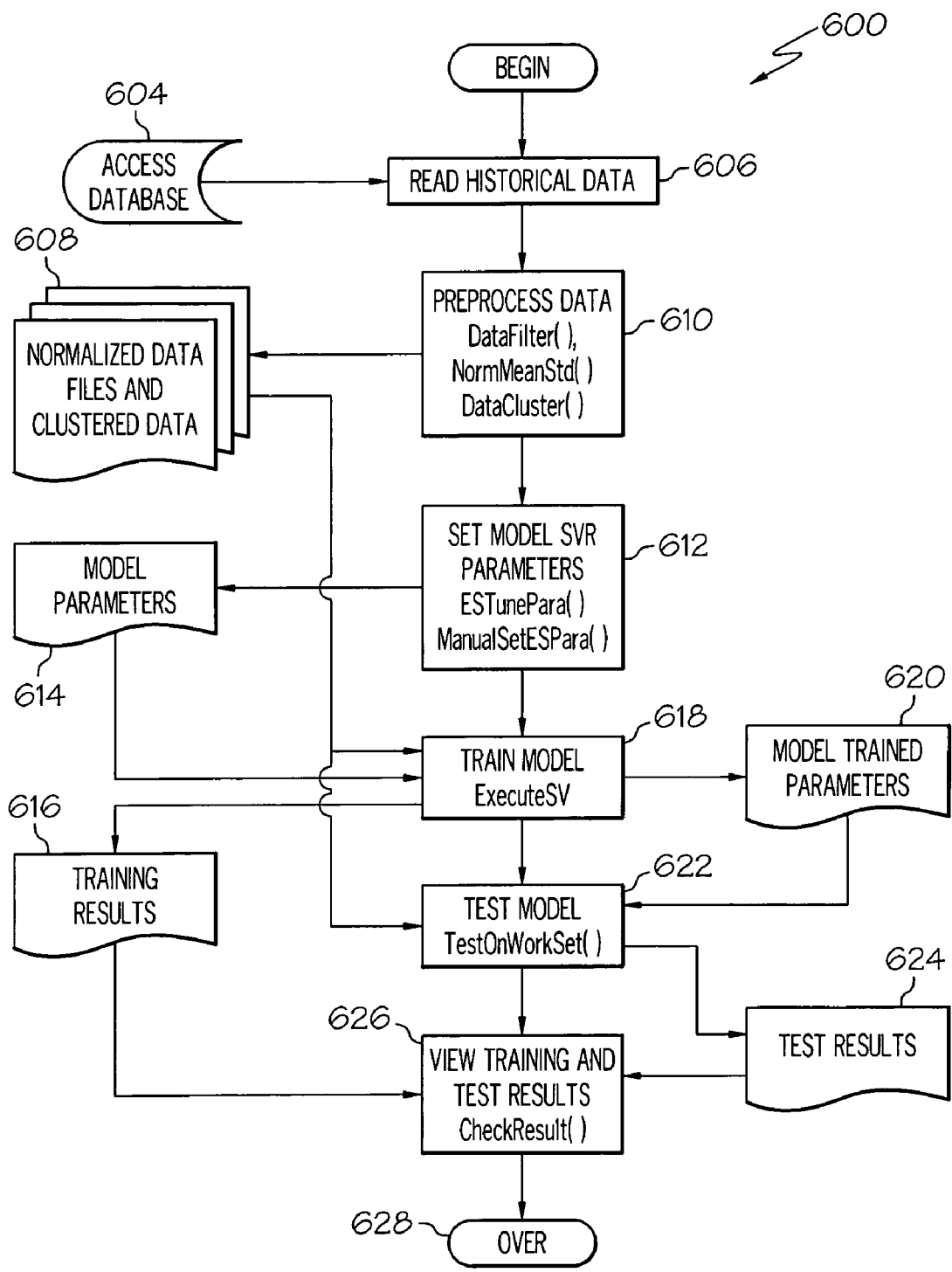
FIG. 6 depicts a flowchart of an exemplary procedure for predicting the first turndown quality of a BOF process.

FIG. 6 is a combination flowchart and block diagram depicting training used in the prediction of first turndown quality. As shown, historical data is first read (step 606) through access of one or more databases (604), including fresh daily BOF operation data. Next, a suitable preprocessing operation is performed (610), including filtering, normalization, and clustering. This data is stored as normalized data files and clustered data (608). Next the model SVR parameters are set (612) and saved (614). These model parameters are then used in step 618 to train the model. This produces model-trained parameters 620 and training results 616. Next, in step 622, the model is tested based on the normalized data 608 to produce test results 624. Finally, the training and test results (616 and 624) are viewed and checked (626).

Figure 8:
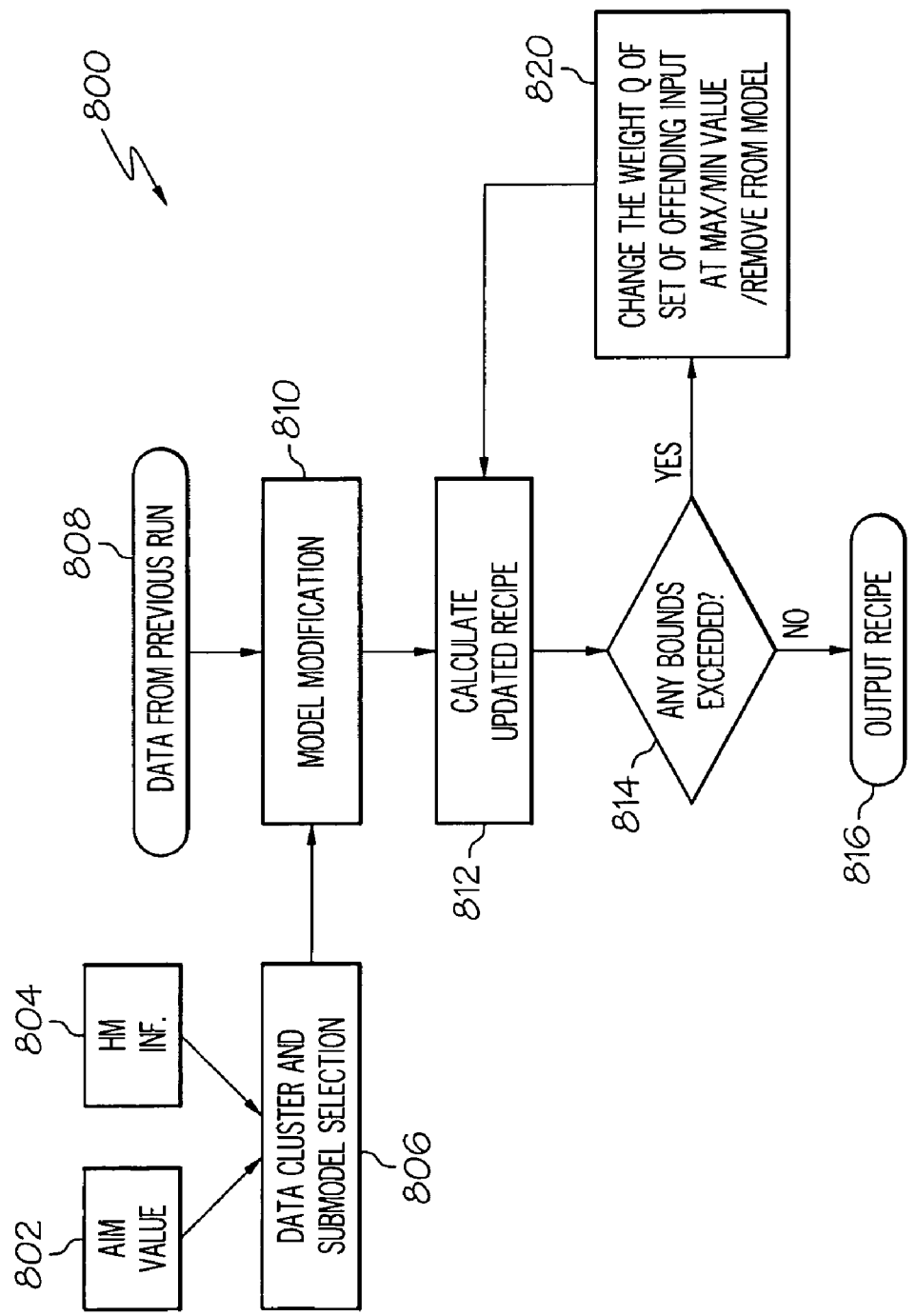
FIG. 8 presents a computer-implemented algorithm for controlling the first turndown quality of a BOF process using the model of FIG. 4.

An exemplary run-to-run control algorithm is shown in FIG. 8. As shown, the system first downloads the historical batch process data, including the aim value 802 of the steel (the aim carbon and hot metal Silicon) and hot metal information 804 (the weight of hot metal, temperature of hot metal, weight of iron ore, weight of burnt lime, weight of scrap, weight of stone, weight of domo, volume of oxygen, chemical composition of hot metal, and run time). The system runs the data preprocessor (step 806) to perform data clustering and classification and output the datasets to train the BOF model. The real-time production data (data from the previous run 808) is then downloaded. The system then uses the preprocessed datasets and the real-time data to perform the BOF model verification/modification (810). The model is run to calculate the adjustment of recipe based on a simple rule set and checks whether the output exceeds the min-max bounds (decision step 814). If the output exceeds any min-max bound, the system adjusts the model parameter and recalculates the adjustment of recipe until it satisfies the constraints (steps 820 and 812). As output, it generates the updated recipe for the next batch (816).

Thus, what has been described herein is an improved method and related systems for quality control of first turndown quality in a basic oxygen furnace process. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for control of a basic oxygen furnace comprising the steps of:
   creating a computer-implemented model of the basic oxygen furnace based on support vector regression (SVR) such that the model is configured to produce a prediction of first turndown quality of steel produced via the basic oxygen furnace, wherein the SVR model is created utilizing sequential minimum optimization;
   receiving historical data associated the first turndown quality;
   applying the model to the historical data to produce the prediction of first turndown quality;
   comparing the prediction of first turndown quality with an actual measurement of first turndown quality;
   adjusting a control recipe for the basic oxygen furnace based at least in part upon a result of the comparing step; and
   adding one or more alloys to a ladle of the basic oxygen furnace in order to give the steel a desired composition.

2. The method of claim 1, wherein the control recipe is a function of an uncontrolled input and an aim quality.

3. The method of claim 1, further including allowing a user to adjust the control recipe manually prior to the adjusting step.

4. The method of claim 1, further including allowing a user to graphically view the control recipe, the model, and the historical data.

5. The method of claim 1, wherein receiving historical data includes receiving the historical data over a network from a database.

6. The method of claim 1, further including a step of preprocessing the historical data.

7. The method of claim 6, wherein the preprocessing step includes normalization and clustering of the historical data.

8. A system for controlling a basic oxygen furnace comprising:
   a database configured to store historical data associated with first turndown quality of the basic oxygen furnace;
   a prediction module coupled to the database, the prediction module including a computer-implemented model of the basic oxygen furnace based on support vector regression (SVR) utilizing sequential minimum optimization such that the model is configured to produce a prediction of first turndown quality of steel produced by the basic oxygen furnace, the prediction module further configured to receive historical data associated the first turndown quality;
   a run-to-run control module coupled to the prediction module, the run-to-run control module configured to apply the model to the historical data to produce the prediction of first turndown quality and compare the prediction of first turndown quality with an actual measurement of first turndown quality and to adjust a control recipe for the basic oxygen furnace based at least in part upon a result of the comparison; and
   one or more alloys added to a ladle of the basic oxygen furnace in order to give the steel a desired composition.

9. The system of claim 8, wherein the control recipe is a function of an uncontrolled input and an aim quality.

10. The system of claim 8, further including a graphical user interface coupled to the prediction module and configured to allow a user to adjust the control recipe manually prior to the adjusting step.

11. The system of claim 10, wherein the graphical user interface is further configured to allow a user to graphically view the control recipe, the model, and the historical data.

12. The system of claim 8, further including a preprocessor configured to provide normalization and clustering of the historical data.

13. The system of claim 8, wherein the database further stores real-time data associated with the basic oxygen furnace and model data associated with the model.

14. A method for predicting first turndown quality in a basic oxygen furnace comprising the steps of:
   receiving historical data associated with the basic oxygen furnace; and
   creating a computer-implemented model of the basic oxygen furnace based on support vector regression (SVR) utilizing sequential minimum optimization applied to the historical data such that the model is configured to produce a prediction of the first turndown quality of the basic oxygen furnace.

15. The method of claim 14, wherein the sequential minimum optimization includes iteratively choosing two Lagrange multipliers to jointly optimize, finding an optimal value for the two Lagrange multipliers, and updating the SVR to reflect the optimal value.

16. The method of claim 14, wherein receiving the historical data includes receiving the historical data over a network.

17. The method of claim 14, further including preprocessing the historical data to produced clustered data.

* * * * *